(12) United States Patent
Lane et al.

(10) Patent No.: US 11,379,432 B2
(45) Date of Patent: Jul. 5, 2022

(54) FILE MANAGEMENT USING A TEMPORAL DATABASE ARCHITECTURE

(71) Applicant: Bank of America Corporation, Charlotte, NC (US)

(72) Inventors: Joshua A. Lane, Babylon, NY (US); Janet A. Caffray, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 67 days.

(21) Appl. No.: 17/006,395

(22) Filed: Aug. 28, 2020

(65) Prior Publication Data

US 2022/0066999 A1    Mar. 3, 2022

(51) Int. Cl.
 *G06F 16/00* (2019.01)
 *G06F 16/18* (2019.01)
 *G06F 16/17* (2019.01)
 *G06F 40/205* (2020.01)
 *G06F 16/16* (2019.01)
 *G06F 16/93* (2019.01)

(52) U.S. Cl.
 CPC ........ *G06F 16/1873* (2019.01); *G06F 16/162* (2019.01); *G06F 16/168* (2019.01); *G06F 16/1734* (2019.01); *G06F 16/93* (2019.01); *G06F 40/205* (2020.01)

(58) Field of Classification Search
 CPC .. G06F 16/1873; G06F 16/162; G06F 16/168; G06F 16/1734; G06F 16/93; G06F 40/205
 See application file for complete search history.

(56) References Cited

U.S. PATENT DOCUMENTS

| | | | |
|---|---|---|---|
| 5,440,730 A | 8/1995 | Elmasri et al. | |
| 5,442,543 A | 8/1995 | Tresp | |
| 6,148,308 A | 11/2000 | Neubauer et al. | |
| 6,185,556 B1 | 2/2001 | Snodgrass et al. | |
| 6,647,382 B1 | 11/2003 | Saracco | |
| 6,925,476 B1* | 8/2005 | Multer | H04L 29/06 |
| 7,158,991 B2 | 1/2007 | Kekre et al. | |
| 7,822,695 B2 | 10/2010 | Solomon | |
| 7,823,055 B2 | 10/2010 | Sull et al. | |
| 8,196,207 B2 | 6/2012 | Hill et al. | |

(Continued)

FOREIGN PATENT DOCUMENTS

| | | |
|---|---|---|
| CA | 2826797 C | 4/2017 |
| EP | 1358579 B1 | 7/2010 |

*Primary Examiner* — Shiow-Jy Fan

(57) ABSTRACT

A device is configured to receive a reconstruction request that identifies a time instance value and an identifier for a portion of a document. The device is further configured to identify a time window between a current time value and the time instance value and to identify entries within a change history log within the time window that are associated with the identifier for the portion of the document. The device is further configured to generate a reconstructed document mapping by undoing the changes to the document mapping based on the identified entries within the change history log that are within the time window and that are associated with the identifier for the portion of the document. The device is configured to undo the changes that were performed by the identified entries in a reverse chronological order. The device is further configured to output the reconstructed document mapping.

20 Claims, 5 Drawing Sheets

(56) References Cited

U.S. PATENT DOCUMENTS

| | | |
|---|---|---|
| 8,219,522 B2 | 7/2012 | Johnston et al. |
| 8,256,004 B1 | 8/2012 | Hill et al. |
| 8,359,284 B2 | 1/2013 | Nemecek et al. |
| 8,407,180 B1 | 3/2013 | Ramesh et al. |
| 8,453,246 B2 | 5/2013 | Lang et al. |
| 8,495,009 B2 | 7/2013 | Khanna |
| 8,620,946 B2 | 12/2013 | Dumant |
| 8,751,285 B2 | 6/2014 | Deb et al. |
| 8,965,889 B2 | 2/2015 | Chan et al. |
| 8,983,928 B2 | 3/2015 | Wable et al. |
| 9,104,713 B2 | 8/2015 | Iyer et al. |
| 9,262,491 B2 | 2/2016 | Namblar et al. |
| 9,298,696 B2 | 3/2016 | Marian et al. |
| 9,344,449 B2 | 5/2016 | Brown et al. |
| 9,407,655 B2 | 8/2016 | Futty |
| 9,442,915 B2 | 9/2016 | Marian et al. |
| 9,588,662 B2 | 3/2017 | Sood et al. |
| 9,635,042 B2 | 4/2017 | Brown et al. |
| 9,721,316 B2 | 8/2017 | Faile, Jr. et al. |
| 9,830,568 B2 | 11/2017 | Johnson |
| 9,898,513 B2 | 2/2018 | McGregor et al. |
| 10,009,227 B2 | 6/2018 | Akella et al. |
| 10,015,156 B2 | 7/2018 | Jones-McFadden et al. |
| 10,440,101 B2 | 10/2019 | Kurian et al. |
| 10,521,418 B2 | 12/2019 | Chen et al. |
| 2004/0088332 A1* | 5/2004 | Lee ................ G06Q 10/10 |
| 2008/0005131 A1 | 1/2008 | Naelon et al. |
| 2009/0030751 A1 | 1/2009 | Barve et al. |
| 2012/0053982 A1 | 3/2012 | Treacey et al. |
| 2012/0303546 A1 | 11/2012 | Zhu et al. |
| 2013/0120439 A1* | 5/2013 | Harris .................. G06T 13/80 |
| | | 345/619 |
| 2013/0166522 A1 | 6/2013 | Kaufmann et al. |
| 2014/0019194 A1 | 1/2014 | Anne |
| 2015/0142509 A1 | 5/2015 | Treacey et al. |
| 2015/0149240 A1 | 5/2015 | Madiraju et al. |
| 2015/0227869 A1 | 8/2015 | Saraf et al. |
| 2015/0242774 A1 | 8/2015 | Wilcox et al. |
| 2015/0254330 A1 | 9/2015 | Chan et al. |
| 2016/0048781 A1 | 2/2016 | Kern et al. |
| 2017/0255524 A1* | 9/2017 | McGrath ............ G06F 16/9566 |
| 2017/0300839 A1 | 10/2017 | Bursey |
| 2019/0281082 A1 | 9/2019 | Carmichael |

* cited by examiner

FILE MANAGEMENT USING A TEMPORAL DATABASE ARCHITECTURE

TECHNICAL FIELD

The present disclosure relates generally to file management, and more specifically to file management using a temporal database architecture.

BACKGROUND

In current computer systems, managing relationships between documents poses several technical challenges. For example, existing computer systems lack the ability to track relationship changes between documents and to assess the impact of these changes with regards to other documents. Over time, relationships between documents change. For instance, a regulation document may be associated with one or more policy documents for an enterprise. As the regulation document changes over time, the regulation document may need to be associated with different or revised policy documents for the enterprise. Existing systems lack the ability to keep track of these types of relationship changes. In existing systems, attempting to store multiple versions of a mapping between documents would involve saving a new file every time the mapping was modified. For systems that manage a large number of documents or systems that frequently change the mapping between documents, this process can quickly consume memory resources if each version of the mapping is saved.

Without the ability to keep track of relationship changes between documents, existing computer systems are also unable to determine any previous mappings or relationships between documents. Determining previous relationships between documents may involve a manual intervention which introduces latency for the computer system. This latency can have a detrimental effect on the performance and throughput of other computer systems that rely on data from the computer system.

SUMMARY

The system disclosed in the present application provides a technical solution to the technical problems discussed above by using a temporal database architecture for storing data. A temporal database is a file management architecture configuration that allows relationships between documents to be tracked over time. This configuration provides a historical record that allows previous relationships between documents to be reconstructed. The disclosed system provides several practical applications and technical advantages which include a process for storing data in a way that allows portions of different documents to be mapped together. For example, portions of a regulation document may be mapped to portions of a policy document, portions of a control document, portions of an exceptions document, portions of an assessment document, and/or portions of any other suitable type of document. This process further includes updating the mapping between different documents over time and recording the changes in a change history log. For example, a regulation document may be initially mapped to a policy document. At a later time, the regulation document may be remapped to a different version of the policy document, a different portion of the policy document, or a different document. This process enables the system to keep track of the changes that are made to the mappings between documents. The disclosed system also provides a process for determining the previous mapping between documents and outputting a reconstructed mapping that identifies how the documents were previously mapped together.

In existing systems, attempting to store multiple versions of a mapping between documents would involve saving a new file every time the mapping was modified. For systems that manage a large number of documents or systems that frequently change the mapping between documents, this process can quickly consume memory resources if each version of the mapping is saved. In contrast, the disclosed system efficiently stores relationship information so that it can be reconstructed by modifying a current mapping. This process consumes fewer memory resources since each version of the mapping does not need to be stored every time there is a change to the mapping. In addition, this process does not require manual intervention to reconstruct previous mappings which avoids introducing additional latency into the system. By reducing the amount of latency that the computer system experiences, the computer system is able to spend more time operating at its full capacity so that the computer system can maintain a higher throughput and improve the utilization of the computer system In one embodiment, the system comprises a system of record device that is configured to use a temporal database architecture. The device is configured to receive a reconstruction request that identifies a time instance value and an identifier for a document. The time instance value identifies a previous day or time. The device is further configured to identify a time window between a current time value and the time instance value and to identify entries within a change history log within the time window that are associated with the document. The device is further configured to generate a reconstructed document mapping by undoing the changes that are made to the document mapping based on the identified entries within the change history log. The device is configured to undo the changes that were performed by the identified entries in a reverse chronological order. This process allows the file management engine to reconstruct an earlier version of the document mapping that corresponds with the identified time in the reconstruction request. The device is further configured to output the reconstructed document mapping.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
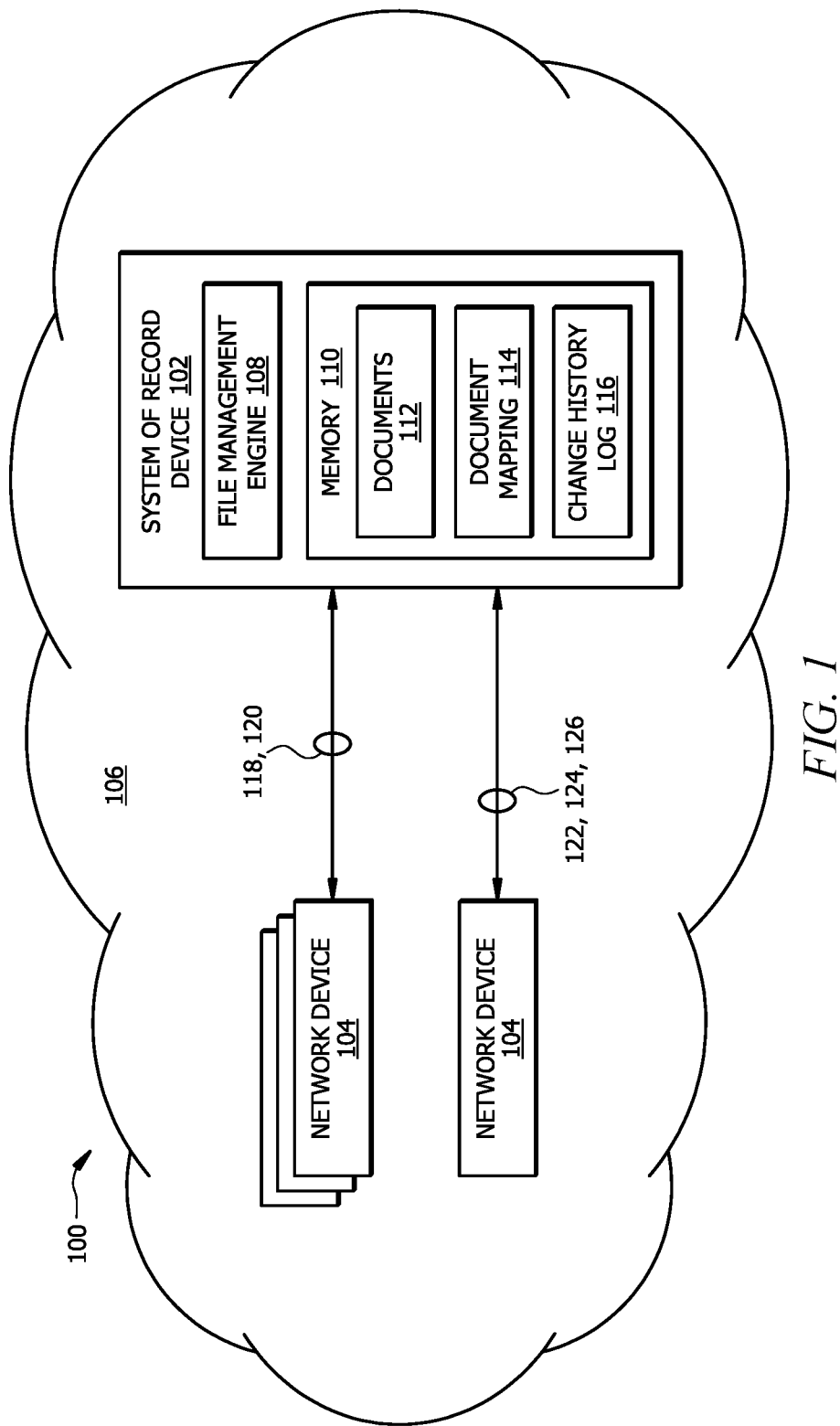
FIG. 1 is a schematic diagram of a file management system that is configured to use a temporal database architecture for storing data.

FIG. 1 is a schematic diagram of a file management system 100 that is configured to use a temporal database architecture for storing data. A temporal database is a file management architecture configuration that allows relationships between documents 112 to be tracked over time. This configuration provides a historical record that allows previous relationships between documents 112 to be tracked and reconstructed. As an example, the file management system 100 may be configured to map internal documents 112 from an enterprise to documents from an entity that is external from the enterprise, for example, a government or a third-party. The file management system 100 allows a user to determine how a document 112 was previously mapped to other documents 112. For instance, the file management system 100 allows a user to determine how a document 112 was mapped to other documents 112 ninety days ago, six months ago, one year ago, or at any other suitable time in history.

The system 100 efficiently stores relationship information so that it can be reconstructed by modifying a current document mapping 114. This process consumes fewer memory resources since each version of the document mapping 114 does not need to be stored every time there is a change to the document mapping 114. In addition, this process does not require manual intervention to reconstruct previous document mappings 114 which avoids introducing additional latency into the system 100.

In one embodiment, the system 100 comprises a system of record device 102 and one or more network devices 104 that are in signal communication with each other within a network 106. Examples of network devices 104 include, but are not limited to, computers, laptops, tablets, smartphones, databases, memories, servers, or any other suitable type of networking device. The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 106 may be configured to support any suitable type of communication protocol as would be appreciated by one of ordinary skill in the art.

System of Record Device

Examples of a system of record device 102 include, but are not limited to, computers, databases, memories, servers, or any other suitable type of networking device. The system of record device 102 is generally configured to save data and files using a temporal database architecture. This configuration allows the system of record device 102 to store data in a way that allows documents 112 to be mapped together. For example, portions of a regulation document may be mapped to portions of a policy document, portions of a control document, portions of an exceptions document, portions of an assessment document, or portions of any other suitable type of document. The system of record device 102 is further configured to update the mapping between different portions of documents 112 over time and to record the changes in a change history log 116. For example, a portion of regulation document may be initially mapped to a portion of a policy document. At a later time, the portion of the regulation document may be remapped to a different version of the policy document, a different portion of the policy document, or a different document. The system of record device 102 is configured to keep track of the changes made to the mappings between documents 112. An example of the system of record device 102 performing this operation is described in more detail in FIG. 2.

The system of record device 102 is further configured to reconstruct previous mappings between documents 112. For example, the system of record device 102 may receive a reconstruction request 118 that requests a mapping between a set of documents 112 at a particular instance in time. The system of record device 102 is configured to determine the previous mapping between the set of documents 112 and to output a reconstructed mapping between the documents 112. An example of the system of record device 102 performing this operation is described in more detail in FIG. 5.

The system of record device 102 comprises a file management engine 108 and a memory 110. The system of record device 102 may be configured as shown or in any other suitable configuration. Additional information about the hardware configuration of the system of record device 102 is described in FIG. 6. The file management engine 108 is generally configured to store data in a way that allows documents 112 to be mapped together using a temporal database architecture, to update the mappings between documents 112 over time using the document mapping 114, and to reconstruct previous mappings between documents in the document mapping 114 using the change history log 116. Examples of the file management engine 108 in operation are described in FIGS. 2 and 5.

The memory 110 is configured to store documents 112, a document mapping 114, a change history log 116, and/or any other suitable type of data. In one embodiment, the documents 112 may comprise regulation documents, policy documents, controls documents, exceptions documents, assessment documents, and/or any other suitable type of documents. A regulation document may be a document from an entity that is external from an enterprise. The regulation document may comprise a plurality of actionable statements that the enterprise should consider to be compliant with the external entity. For example, the source of a regulation document may be a governance entity. In this example, a business should address the actionable statements within the regulation document in order to be compliant with the governance entity. A policy document is a document that comprises rules, standards, and/or policies that an enterprise has in place to address actionable statements from a regulation document. A controls document is a document that describes how an enterprise implements rules, standards, or policies from a policy document. For example, the controls document may identify software and/or hardware that are used to implement various rules, standards, and/or policies. An exceptions document comprises information about any deviations or exceptions from the rules, standards, or policies that an enterprise has in place. For example, the exceptions document may identify alternative rules, standards, and/or policies that may be used in some instances. An assessment document comprises information that is associated with assessing or testing rules, standards, and/or policies that are implemented by an enterprise. In other examples, the documents 112 may comprise any other suitable type of documents.

Figure 3:
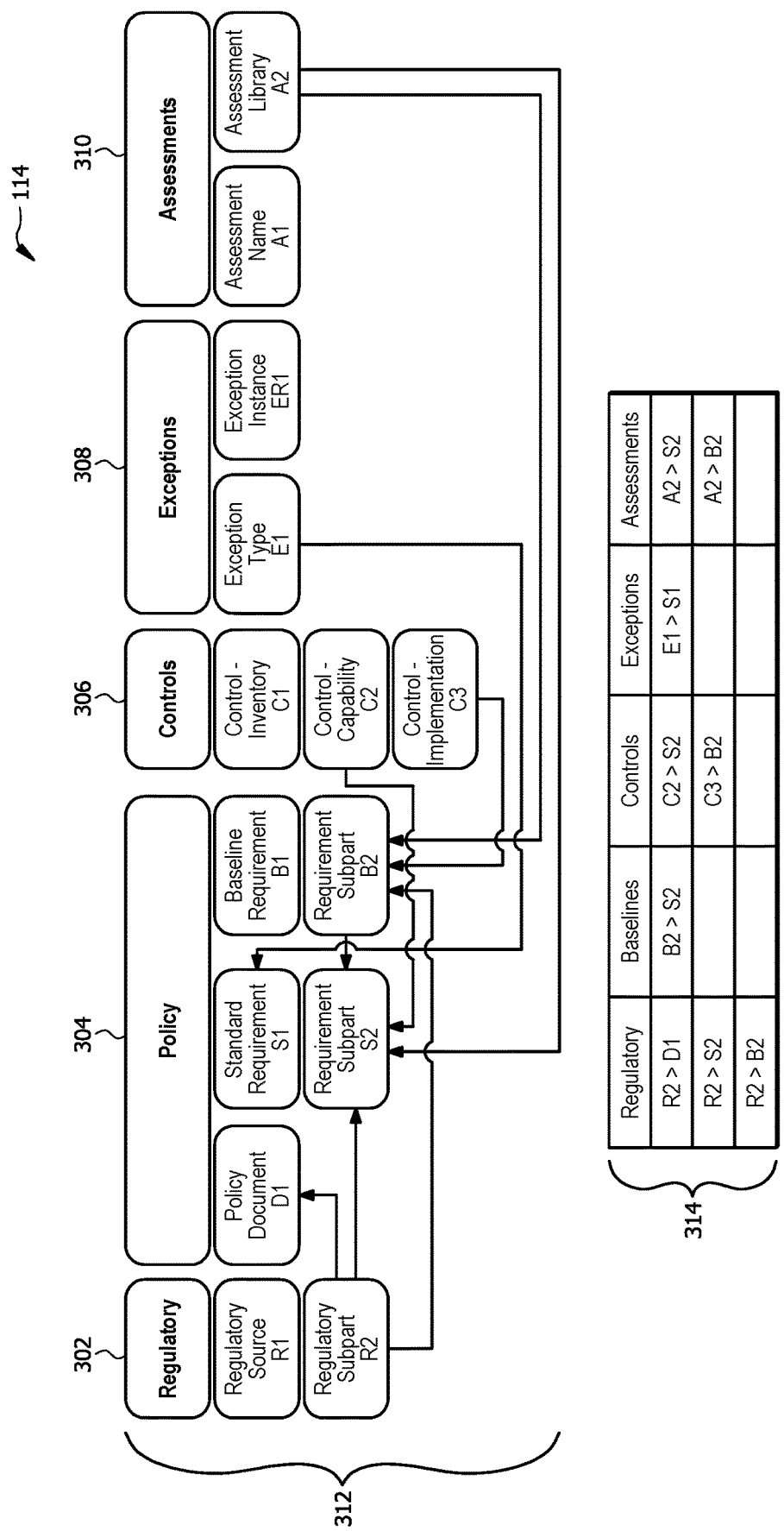
FIG. 3 is an example of a document mapping that is stored in a temporal database architecture.

The document mapping 114 is generally configured to map portions of a document to portions of other documents. Referring to the example shown in FIG. 3, a document mapping 114 may be configured to provide a mapping among a regulation document 302, a policy document 304, a controls document 306, an exceptions document 308, and an assessment document 310. In this example, the regulation document 302 comprises information about a regulatory source and one or more sub-parts with actionable statements. The policy document 304 comprises standard requirements and baseline requirements. The controls document 306 comprises information associated with an inventory, information associated with capabilities, and information associated with implementations. The exceptions document 308 comprises information about exception types and information about exception instances. The assessment document 310 comprises an assessment identifier (e.g. name) and information associated with an assessment library. In other examples, the document mapping 114 may be configured to provide a mapping between any other suitable portions of a document. The document mapping 114 may be represented graphically as a schematic 312, as a table 314, or in any other suitable format.

The change history log 116 is generally configured to track the changes that are made to a document mapping 114 over time. For example, a change history log 116 may identify changes that made to the document mapping 114 and may include timestamps that are associated with the changes that are made to the document mapping 114. Referring to the example shown in FIG. 4, the change history log 116 comprises a plurality of entries 402 that contains information about changes to the document mapping 114. In this example, each entry 402 identifies a first element 404 (e.g. a portion of a first document) that is mapped to a second element 406 (e.g. a portion of a second document) and an action 408 that was performed on the mapping between the first element 404 and the second element 406. Examples of actions that can be performed on a mapping between elements include, but are not limited to, creating a new mapping between elements and deleting a mapping between elements. Each entry 402 further comprises a timestamp 410 that is associated with the action 408 that is performed on the mapping between the elements.

Data Control Process

Figure 2:
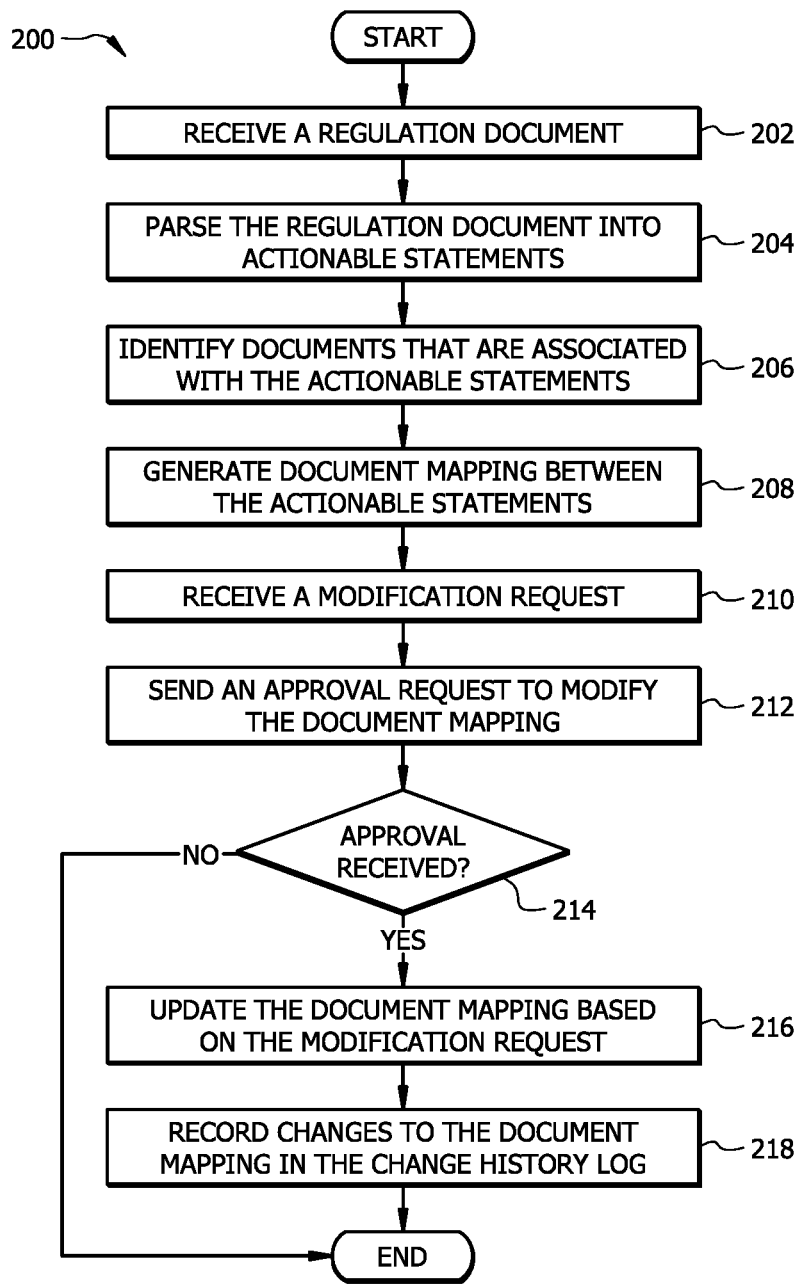
FIG. 2 is a flowchart of an embodiment of a data storing process using a temporal database architecture.

FIG. 2 is a flowchart of an embodiment of a data storing process 200 using a temporal database architecture. The system of record device 102 may employ process 200 to store documents such that portions of different documents to be mapped together using a document mapping 114. The system of record device 102 may also employ process 200 to update the mappings between different portions of documents 112 over time. The following is a non-limiting example of generating and maintaining document mapping 114 between a regulation document 112 and other types of documents 112 that are stored in memory 110. In other examples, process 200 may be employed to generating a document mapping 114 for any other suitable combination of documents 112.

Generating a Document Mapping

At step 202, the file management engine 108 receives a regulation document. As an example, the file management engine 108 may receive a regulation document that is to be mapped to one or more of the document documents 112 that are stored in memory 110. In other examples, the file management engine 108 may receive any other suitable type of document that is to be mapped to one or more documents that are stored in memory 110.

At step 204, the file management engine 108 parses the regulation document into actionable statements. For example, the file management engine 108 may output the received document to a user to allow the user to parse the received document into actionable statements. For example, the file management engine 108 may present the regulation document to a user using a graphical user interface. The graphical user interface may allow the user to provide a user input to the file management engine 108 that identifies one or more actionable statements from within the text of the regulation document.

As another example, the file management engine 108 may employ natural language processing to parse the regulation document into actionable statements. For example, the file management engine 108 may first parse the regulation document into a set of sentences. The file management engine 108 may then use natural language processing or machine learning to identify any sentences that are actionable statements. For example, the file management engine 108 may identify a sentence that contains one or more predefined keywords as an actionable statement. In other examples, the file management engine 108 may parse the regulation document into actionable statements using any other suitable technique.

At step 206, the file management engine 108 identifies documents 112 that are associated with the actionable statements. For example, the file management engine 108 may output the actionable statements to a user to allow the user to identify documents 112 that are associated with actionable statements. For example, the file management engine 108 may present the actionable statements to a user using a graphical user interface. The graphical user interface may allow the user to provide a user input to the file management engine 108 that identifies associations between documents 112 stored in memory 110 and actionable statements. In other examples, the file management engine 108 may identify documents 112 that are associated with the actionable statements using any other suitable technique.

At step 208, the file management engine 108 generates a document mapping 114 between the actionable statements and the identified document documents 112. After determining relationships between the actionable statements and the documents 112 that are stored in memory 110, the file management engine 108 is able to generate a document mapping 114 that represents how the actionable statements are mapped to different documents 112 or portions of documents 112 that are stored in memory 110. The file management engine 108 may then generate a representation of the document mapping 114. The document mapping 114 may be represented using flowcharts, schematic diagrams, tables, or any other suitable type of visual representation.

Updating the Document Mapping

Once the document mapping 114 has been generated, the file management engine 108 will track the changes to the document mapping 114 using the change history log 116. This process allows the file management engine 108 to keep a history of the changes that were made to the document mapping 114 over time which allows the file management engine 108 to later reconstruct an earlier version of the document mapping 114. For example, the file management engine 108 can reconstruct how the document mapping 114 would have looked ten days ago, thirty days ago, ninety days ago, one year ago, or at any other suitable time instance.

At step 210, the file management engine 108 receives a modification request 122. For example, a user may use a network device 104 to send a modification request 122 to the file management engine 108 to request a change to the document mapping 114. The approval request 124 may identify the source of the modification request 122, the requested modifications to the document mapping 114, and/or any other suitable type of information associated with modifying a mapping within the document mapping 114. Examples of modification requests include, but are not limited to, deleting a mapping between documents 112 and adding a mapping between documents 112.

At step 212, the file management engine 108 sends an approval request 124 to modify a document mapping 114. In some embodiments, the file management engine 108 may request for approval before making changes to the document mapping 114. In this case, the file management engine 108 may send an approval request 124 to an approver for approval before modifying the document mapping 114. The approval request 124 may comprise information from the modification request 122. For example, the approval request 124 may identify the source of the modification request 122, the requested modifications to the document mapping 114, and/or any other suitable type of information.

At step 214, the file management engine 108 determines whether an approval 126 has been received. Here, the file management engine 108 determines whether the approver has sent an approval 126 for the requested modifications to the document mapping 114. For example, the approver may send a message to the file management engine 108 that indicates whether the approver approves of the requested modifications to the document mapping 114.

The file management engine 108 terminates process 200 in response to determining that an approval 126 has not been received in response to sending the approval request 124. In this case, the file management engine 108 determines that the requested modifications to the document mapping 114 were not approved. In response to determining that the approver does not approve the requested modifications to the document mapping 114, the file management engine 108 will not modify the document mapping 114 and no further action is necessary.

The file management engine 108 proceeds to step 216 in response to determining that an approval 126 has been received in response to sending the approval request 124. In this case, the file management engine 108 determines that the approver approves of the requested modifications to the document mapping 114. In response to determining that the approver approves the requested modifications to the document mapping 114, the file management engine 108 will proceed with modifying the document mapping 114 in accordance with the modification request 122.

At step 216, the file management engine 108 updates the document mapping 114 based on the modification request 122. The modification request 122 may comprise instructions for deleting a mapping between documents 112, adding a mapping between documents 112, and/or to perform any other suitable type of operation on the document mapping 114. In one embodiment, the modification request 122 may comprise instructions that identify a first element (e.g. a first document 112 or a portion of a first document 112), a second element (e.g. a second document 112 or a portion of the second document 112), and an action to perform between the first element and the second element. For example, the modification request 122 may comprise instructions that identify a first document 112 and a second document 112. The modification request 122 may further comprise instructions that indicate to create a mapping between the first document 112 and the second document 112. As another example, the modification request 122 may further comprise instructions that indicate to delete an existing mapping between the first document 112 and the second document 112. In other examples, the modification request 122 may further comprise instructions that indicate to perform any other suitable type of action or operation between the first document 112 and the second document 112.

At step 218, the file management engine 108 records changes to the document mapping 114 in the change history log 116. The file management engine 108 creates entries 402 in the change history log 116 that identifies the changes that were made to the document mapping 114. For example, the file management engine 108 may identify a first element (e.g. a first document 112), a second element (e.g. a second document 112), and an action that was performed between the first element and the second element. The file management engine 108 will also associate a timestamp with the entry 402 to indicate when the action was performed. The file management engine 108 will create a series of entries 402 in chronological order that describes all of the modifications to the document mapping 114. After updating the change history log 116, the file management engine 108 will wait until another modification request 122 is received that requests additional modifications to the document mapping 114.

Data Retrieval Process

Figures 4, 5:
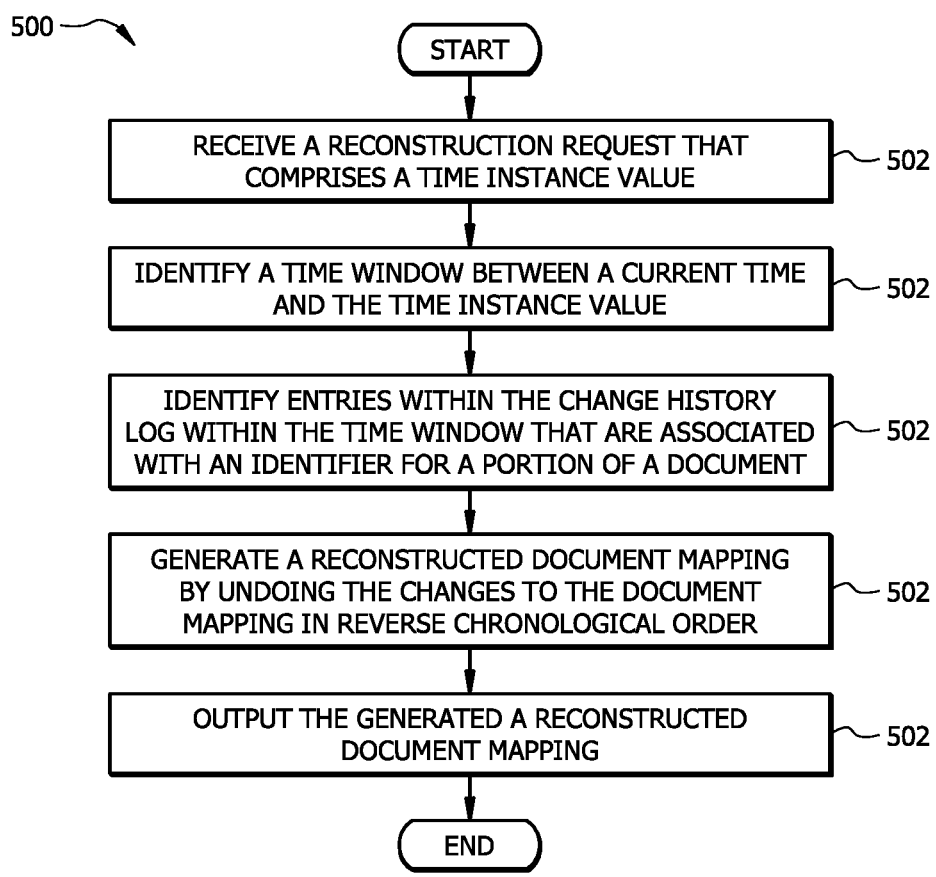
FIG. 4 is an example of a change history log for a temporal database architecture.
FIG. 5 is a flowchart of an embodiment of a data retrieval process using a temporal database architecture.

FIG. 5 is a flowchart of an embodiment of a data retrieval process 500 using a temporal database architecture. The system of record device 102 may employ process 500 to reconstruct previous mappings between documents 112 in the document mapping 114 using the change history log 116. In contrast to existing computer systems, the system of record device 102 efficiently stores relationship information so that it can be reconstructed by modifying a current document mapping 114. This process consumes fewer memory resources since each version of the document mapping 114 does not need to be stored every time there is a change to the document mapping 114. In addition, this process does not require manual intervention to reconstruct previous document mappings 114 which avoids introducing additional latency into the system 100.

At step 502, the file management engine 108 receives a reconstruction request 118. In one embodiment, the reconstruction request 118 identifies a time instance value and comprises an identifier for a portion of a document. The time instance value is a timestamp value that can be used to look up entries 402 in the change history log 116. The time instance value may comprise a date and/or time. The identifier may be any suitable type of identifier that identifies a document 112 or a portion (e.g. a paragraph or section) of the document 112. For example, the identifier may be a document name, line numbers, page numbers, section numbers, or any other suitable type of alphanumeric identifier. As an example, a user may send a reconstruction request 118 to query the system of record device 102 about the mappings that were associated with a regulation document 112 ninety days ago. In this example, the reconstruction request 118 may comprise an identifier for the regulation document 112 and a timestamp that identifies the date ninety days ago.

At step 504, the file management engine 108 identifies a time window 412 between a current time and the time instance value. Here, the file management engine 108 determines a time window 412 that can be used to identify entries 402 in the change history log 116 that correspond with changes that were made since the time identified time instance value. Continuing with the previous example, the time instance value may identify a date that occurred ninety days ago. In this example, the file management engine 108 may identify a time window 412 includes a range of dates between the current date and the date ninety days ago.

At step 506, the file management engine 108 identifies entries 402 within the change history log 116 within the time window 412 that are associated with the identifier for the portion of the document 112. Here, the file management engine 108 identifies entries 402 within the change history log 116 that are associated with the changes that were made to the portion of the document 112 within the time window 412. Referring to the example in FIG. 4, the file management engine 108 identifies a range of entries 402 that are associated with timestamps 410 within the determined time window 412. The file management engine 108 then identifies the entries 402 within the time window 412 that are associated with the identifier for the portion of the document 112 from the reconstruction request 118. As an example, the reconstruction request 118 may identify a portion of a regulation document 112 which is represented as 'R2 v1' in FIG. 4. In this example, the file management engine 108 identifies all of the entries 402 within the time window 412 that are associated with the portion of the document 112 that is identified by the reconstruction request 118. The identified entries 402 provide a history of the changes that were made to the mapping between the portion of the document 112 that is identified by the reconstruction request 118 and other documents 112 stored in memory 110 since the date identified by the time instance value. Continuing with the previous example, the identified entries 402 identify the changes that were made to mappings to the portion of the regulation document 112 within the last ninety days.

Returning to FIG. 5 at step 508, the file management engine 108 generates a reconstructed document mapping 120 by undoing the changes to the document mapping 114 in reverse chronological order. Here, the file management engine 108 obtains the current document mapping 114 and begins undoing the changes that were made to the document mapping 114 in reverse chronological order from the current date to the date identified in the reconstruction request 118. Continuing with our previous example, the file management engine 108 may first obtain the most recent document mapping 114. The file management engine 108 then begins with the current date and starts undoing changes to the document mapping 114 using the entries 402 identified in step 506 to reconstruct how the document mapping 114 would have looked ninety days ago.

As an example, the file management engine 108 may identify an entry 402 that indicates that a mapping between the portion of the regulation document 112 and a portion of another document 112 was deleted. In this case, the file management engine 108 will recreate the mapping between the portion of the regulation document 112 and the portion of the other document 112. As another example, the file management engine 108 may identify an entry 402 that indicates that a mapping between the portion of the regulation document 112 and a portion of another document 112 was created. In this case, the file management engine 108 will delete the mapping between the portion of the regulation document 112 and the portion of the other document 112.

As another example, the file management engine 108 may identify a first entry 402 that deletes an existing mapping between the portion of the regulation document 112 and a first version of another document 112. The file management engine 108 may also identify a second entry 402 that creates a mapping between the portion of the regulation document 112 and a second version of the other document 112. In other words, the identified entries 402 describe updating the mapping between the portion of the regulation document 112 and a different version of the other document 112. In this case, the file management engine 108 will first delete the mapping between the portion of the regulation document 112 and the second version of the other document 112. The file management engine 108 will then recreate a mapping between the portion of the regulation document 112 and the first version of the other document 112. In one embodiment, recreating the mapping between the portion of the regulation document 112 and the first version of the other document 112 may comprise obtaining the first version of the other document 112 from memory 110. For example, the file management engine 108 may obtain an identifier from the entry 402 in the change history log 116 that references the first version of the other document 112. The file management engine 108 may then use the obtained identifier as a search token to obtain the first version of the other document 112 from memory 110.

As another example, the file management engine 108 may identify a first entry 402 that deletes an existing mapping between the portion of the regulation document 112 and a second document 112. The file management engine 108 may also identify a second entry 402 that creates a mapping between the portion of the regulation document 112 and a third document 112. In other words, the identified entries 402 describe remapping the portion of the regulation document 112 from one document to a different document 112. In this case, the file management engine 108 will first delete the mapping between the portion of the regulation document 112 and the third document 112. The file management engine 108 will then recreate a mapping between the portion of the regulation document 112 and the second document 112.

After undoing the changes to the document mapping 114 in reverse chronological order, the file management engine 108 is able to generate the reconstructed document mapping 120 that represents how the document mapping 114 would have looked at the date identified in the reconstruction request 118. The file management engine 108 may then generate a representation of the reconstructed document mapping 120. The reconstructed document mapping 120 may be represented using flowcharts, schematic diagrams, tables, or any other suitable type of visual representation. For example, the reconstructed document mapping 120 may be configured to the document mapping 114 shown in FIG. 3.

At step 510, the file management engine 108 outputs the generated reconstructed document mapping 120. For example, outputting the generated reconstructed document mapping 120 may comprise identifying the network device 104 that sent the reconstruction request 118 and sending a representation of the reconstructed document mapping 120 to the identified network device 104. For example, the file management engine 108 may use information from a header of the reconstruction request 118 that identifies a source of the reconstruction request 118. After generating the reconstructed document mapping 120, the file management engine 108 sends the reconstructed document mapping 120 to the identified network device 104. The file management engine 108 may send the reconstructed document mapping 120 as an email, an application notification, or in any other suitable format. As another example, outputting the generated reconstructed document mapping 120 may comprise generating a representation of the reconstructed document mapping 120 and displays the representation of the reconstructed document mapping 120 on a graphical user interface. In other examples, the file management engine 108 may output the generated reconstructed document mapping 120 using any other suitable technique.

Hardware Configuration for a Data Control Device

Figure 6:
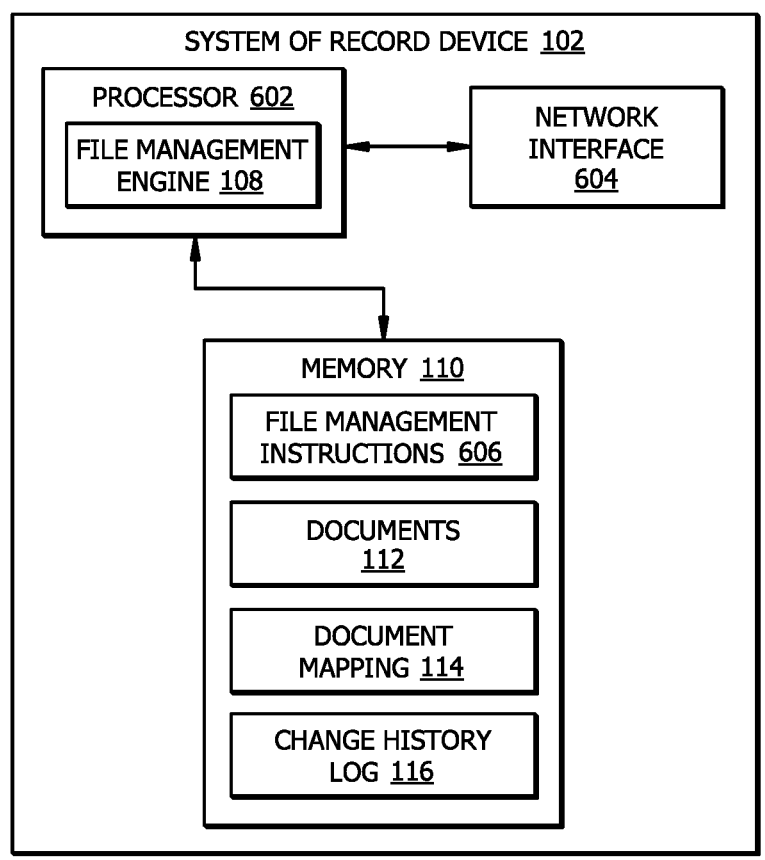
FIG. 6 is an embodiment of a device configured to use a temporal database architecture for storing data.

FIG. 6 is an embodiment of a device (e.g. a system of record device 102) configured to use a temporal database architecture for storing data. In other embodiments, the device may be used to implement various components of system 100 illustrated in FIG. 1. For example, network device 104 of FIG. 1 may be implemented using a corresponding device or a corresponding collection of devices. As an example, the system of record device 102 comprises a processor 602, a memory 110, and a network interface 604. The system of record device 102 may be configured as shown or in any other suitable configuration.

The processor 602 comprises one or more processors operably coupled to the memory 110. The processor 602 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 110. The one or more processors are configured to process data and may be implemented in hardware or software. For example, the processor 602 may be 8-bit, 16-bit, 32-bit, 64-bit, or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute file management instructions 606 to implement a file management engine 108. In this way, processor 602 may be a special-purpose computer designed to implement the functions disclosed herein. In an embodiment, the file management engine 108 is implemented using logic units, FPGAs, ASICs, DSPs, or any other suitable hardware. The file management engine 108 is configured to operate as described in FIGS. 1-5. For example, the file management engine 108 may be configured to perform the steps of process 200 and 500 as described in FIGS. 2 and 5, respectively.

The memory 110 is operable to store any of the information described above with respect to FIGS. 1-5 along with any other data, instructions, logic, rules, or code operable to implement the function(s) described herein when executed by the processor 602. The memory 110 comprises one or more disks, tape drives, or solid-state drives, and may be used as an over-flow data storage device, to store programs when such programs are selected for execution, and to store instructions and data that are read during program execution. The memory 110 may be volatile or non-volatile and may comprise a read-only memory (ROM), random-access memory (RAM), ternary content-addressable memory (TCAM), dynamic random-access memory (DRAM), and static random-access memory (SRAM).

The memory 110 is operable to store file management instructions 606, documents 112, document mappings 114, change history logs 116, and/or any other data or instructions. The file management instructions 606 may comprise any suitable set of instructions, logic, rules, or code operable to execute the file management engine 108. The documents 112, the document mappings 114, and the change history logs 116 are configured similar to the documents 112, the document mappings 114, and the change history logs 116 described in FIGS. 1-5.

The network interface 604 is configured to enable wired and/or wireless communications. The network interface 604 is configured to communicate data between the system of record device 102 and other devices (e.g. network devices 104), systems, or domains. For example, the network interface 604 may comprise a near-field communication (NFC) interface, a Bluetooth interface, Zigbee interface, a Z-wave interface, a Radio-Frequency Identification (RFID) interface, a WIFI interface, a LAN interface, a WAN interface, a modem, a switch, or a router. The processor 602 is configured to send and receive data using the network interface 604. The network interface 604 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:
1. A system of record device, comprising:
  a memory operable to store:
    a plurality of text documents;
    a document mapping configured to map portions of a text document to portions of another text document; and a change history log that comprises a plurality of entries, wherein each entry identifies:
  a change made to the document mapping; and
  a timestamp that is associated with the change that is made to the document mapping;
a processor operably coupled to the memory, configured to:
  receive a reconstruction request that identifies a time instance value and an identifier for a portion of a text document;
  identify a time window between a current time value and the time instance value;
  identify entries within the change history log within the time window that are associated with the identifier for the portion of the text document;
  generate a reconstructed document mapping by undoing the changes to the document mapping based on the identified entries within the change history log that are within the time window and that are associated with the identifier for the portion of the text document, wherein:
    undoing the changes is performed based on the identified entries in a reverse chronological order;
    the reconstructed document mapping identifies portions of other text documents that are mapped to the portion of the text document at the time instance value; and
    generating the reconstructed document mapping comprises modifying a mapping between the portion of the text document and portions of other text documents; and
  output the reconstructed document mapping.

2. The device of claim 1, wherein the document mapping is configured to map text documents from an enterprise to text documents that are associated with an entity that is external from the enterprise.

3. The device of claim 1, wherein:
identifying entries within the change history log comprises identifying an entry that indicates deleting an existing mapping between a portion of a first text document and a portion of a second text document; and
generating the reconstructed document mapping comprises creating a mapping between the portion of the first text document and the portion of the second text document.

4. The device of claim 1, wherein:
identifying entries within the change history log comprises identifying an entry that indicates creating a new mapping between a portion of a first text document and a portion of second text document; and
generating the reconstructed document mapping comprise deleting the mapping between the portion of the first text document and the portion of the second text document.

5. The device of claim 1, wherein:
identifying entries within the change history log comprises:
  identifying a first entry that indicates deleting an existing mapping between a portion of a first text document and a first version of a portion of a second text document; and
  identifying a second entry that indicates creating a mapping between the portion of the first text document and a second version of the portion of the second text document, wherein the second entry is associated with a timestamp that occurs after a timestamp that is associated with the first entry; and
generating the reconstructed document mapping comprises:
  deleting the mapping between the portion of the first text document and the second version of the portion of the second text document; and
  creating a mapping between the portion of the first text document and the first version of the portion of the second text document.

6. The device of claim 1, wherein:
identifying entries within the change history log comprises:
  identifying a first entry that indicates deleting an existing mapping between a portion of a first text document and a portion of a second text document; and
  identifying a second entry that indicates creating a mapping between the portion of the first text document and a portion of a third text document, wherein the third text document is different from the second text document, wherein the second entry is associated with a timestamp that occurs after a timestamp that is associated with the first entry; and
generating the reconstructed document mapping comprises:
  deleting the mapping between the portion of the first text document and the portion of the third text document; and
  creating a mapping between the portion of the first text document and the portion of the second text document.

7. The device of claim 1, wherein:
the processor is further configured to identify a network device that sent the reconstruction request; and
outputting the reconstructed document mapping comprises sending a representation of the reconstructed document mapping to the network device.

8. The device of claim 1, wherein outputting the reconstructed document mapping comprises:
generating a representation of the reconstructed document mapping; and
displaying the representation of the reconstructed document mapping on a graphical user interface.

9. The device of claim 1, wherein the processor is further configured to:
receive a first text document;
parse the first text document into actionable statements;
identify one or more text documents that are associated with the actionable statements from the plurality of text documents that are stored in the memory; and
generate the document mapping that maps the actionable statements from the first text document to the one or more text documents that are associated with the actionable statements from among the plurality of text documents that are stored in the memory.

10. A data retrieval method, comprising:
receiving a reconstruction request that identifies a time instance value and an identifier for a portion of a text document;
identifying a time window between a current time value and the time instance value;
identifying entries within a change history log within the time window that are associated with the identifier for the portion of the text document, wherein the change history log that comprises a plurality of entries, wherein each entry identifies:
  a change made to a document mapping that map portions of a text document to portions of another text document; and a timestamp that is associated with the change that is made to the text document mapping;

generating a reconstructed document mapping by undoing the changes to the document mapping based on the identified entries within the change history log that are within the time window and that are associated with the identifier for the portion of the text document, wherein:

undoing the changes is performed based on the identified entries in a reverse chronological order;

the reconstructed document mapping identifies portions of other text documents that are mapped to the portion of the text document at the time instance value; and generating the reconstructed document mapping comprises modifying a mapping between the portion of the text document and portions of the other text documents; and outputting the reconstructed document mapping.

11. The method of claim 10, wherein:

identifying entries within the change history log comprises identifying an entry that indicates deleting an existing mapping between a portion of a first text document and a portion of a second text document; and generating the reconstructed document mapping comprises creating a mapping between the portion of the first text document and the portion of the second text document.

12. The method of claim 10, wherein:

identifying entries within the change history log comprises identifying an entry that indicates creating a new mapping between a portion of a first text document and a portion of second text document; and generating the reconstructed document mapping comprise deleting the mapping between the portion of the first text document and the portion of the second text document.

13. The method of claim 10, wherein:

identifying entries within the change history log comprises:

identifying a first entry that indicates deleting an existing mapping between a portion of a first text document and a first version of a portion of a second text document; and identifying a second entry that indicates creating a mapping between the portion of the first text document and a second version of the portion of the second text document, wherein the second entry is associated with a timestamp that occurs after a timestamp that is associated with the first entry; and generating the reconstructed document mapping comprises:

deleting the mapping between the portion of the first text document and the second version of the portion of the second text document; and creating a mapping between the portion of the first text document and the first version of the portion of the second text document.

14. The method of claim 10, wherein:

identifying entries within the change history log comprises:

identifying a first entry that indicates deleting an existing mapping between a portion of a first text document and a portion of a second text document; and identifying a second entry that indicates creating a mapping between the portion of the first text document and a portion of a third text document, wherein the third text document is different from the second text document, wherein the second entry is associated with a timestamp that occurs after a timestamp that is associated with the first entry; and generating the reconstructed document mapping comprises:

deleting the mapping between the portion of the first text document and the portion of the third text document; and creating a mapping between the portion of the first text document and the portion of the second text document.

15. The method of claim 10, further comprising identifying a network device that sent the reconstruction request; and wherein outputting the reconstructed document mapping comprises sending a representation of the reconstructed document mapping to the network device.

16. The method of claim 10, wherein outputting the reconstructed document mapping comprises:

generating a representation of the reconstructed document mapping; and displaying the representation of the reconstructed document mapping on a graphical user interface.

17. The method of claim 10, further comprising:

receiving a first text document;

parsing the first text document into actionable statements;

identifying one or more text documents that are associated with the actionable statements from the plurality of text documents that are stored in a memory; and generating the document mapping that maps the actionable statements from the first text document to the one or more text documents that are associated with the actionable statements from among the plurality of text documents that are stored in the memory.

18. A computer program comprising executable instructions stored in a non-transitory computer readable medium that when executed by a processor causes the processor to:

receive a reconstruction request that identifies a time instance value and an identifier for a portion of a text document;

identify a time window between a current time value and the time instance value;

identify entries within a change history log within the time window that are associated with the identifier for the portion of the text document, wherein the change history log that comprises a plurality of entries, wherein each entry identifies:

a change made to a document mapping that map portions of a text document to portions of another text document; and a timestamp that is associated with the change that is made to the document mapping;

generate a reconstructed document mapping by undoing the changes to the document mapping based on the identified entries within the change history log that are within the time window and that are associated with the identifier for the portion of the text document, wherein:

undoing the changes is performed based on the identified entries in a reverse chronological order;

the reconstructed document mapping identifies portions of other text documents that are mapped to the portion of the text document at the time instance value; and generating the reconstructed document mapping comprises modifying a mapping between the portion of the text document and portions of other text documents; and output the reconstructed document mapping.

19. The computer program of claim 18, wherein:

identifying entries within the change history log comprises:

identifying a first entry that indicates deleting an existing mapping between a portion of a first text document and a first version of a portion of a second text document; and identifying a second entry that indicates creating a mapping between the portion of the first text document and a second version of the portion of the second text document, wherein the second entry is associated with a timestamp that occurs after a timestamp that is associated with the first entry; and generating the reconstructed document mapping comprises:

deleting the mapping between the portion of the first text document and the second version of the portion of the second text document; and creating a mapping between the portion of the first text document and the first version of the portion of the second text document.

20. The computer program of claim 18, wherein:

identifying entries within the change history log comprises:

identifying a first entry that indicates deleting an existing mapping between a portion of a first text document and a portion of a second text document; and identifying a second entry that indicates creating a mapping between the portion of the first text document and a portion of a third text document, wherein the third text document is different from the second text document, wherein the second entry is associated with a timestamp that occurs after a timestamp that is associated with the first entry; and generating the reconstructed document mapping comprises:

deleting the mapping between the portion of the first text document and the portion of the third text document; and creating a mapping between the portion of the first text document and the portion of the second text document.

\* \* \* \* \*